(12) United States Patent
Lautenschlager et al.

(10) Patent No.: US 11,535,459 B2
(45) Date of Patent: Dec. 27, 2022

(54) METHOD AND DEVICE FOR BUFFERING CONTAINERS

(71) Applicant: KRONES AG, Neutraubling (DE)

(72) Inventors: Franz Lautenschlager, Barbing (DE); Thekla Osswald, Regensburg (DE); Martin Seger, Neumarkt in der Oberpfalz (DE); Torsten Kilgenstein, Manching (DE); Peter Muehlstein, Koefering (DE)

(73) Assignee: KRONES AG, Neutraubling (DE)

( * ) Notice: Subject to any disclaimer, the term of this patent is extended or adjusted under 35 U.S.C. 154(b) by 30 days.

(21) Appl. No.: 17/354,994

(22) Filed: Jun. 22, 2021

(65) Prior Publication Data
US 2021/0395020 A1 Dec. 23, 2021

(30) Foreign Application Priority Data

Jun. 22, 2020 (DE) .......................... 102020207679.0

(51) Int. Cl.
*B65G 47/51* (2006.01)
*B65G 1/00* (2006.01)

(52) U.S. Cl.
CPC ........... *B65G 47/5131* (2013.01); *B65G 1/00* (2013.01); *B65G 2201/0235* (2013.01)

(58) Field of Classification Search
CPC ............ B65G 47/5113; B65G 47/5131; B65G 2201/0235; B65G 2201/0244; B65G 1/00; B65G 47/51

(Continued)

(56) References Cited

U.S. PATENT DOCUMENTS

| 1,701,433 A | 2/1929 | Witt |
| 2,689,669 A | 9/1954 | Ericson |

(Continued)

FOREIGN PATENT DOCUMENTS

| DE | 534874 C | 10/1931 |
| DE | 1288857 B | 2/1969 |

(Continued)

OTHER PUBLICATIONS

Japanese Patent Office, Office Action Issued in Application No. 2020-194403, dated Nov. 2, 2021, 9 pages.

*Primary Examiner* — James R Bidwell
(74) *Attorney, Agent, or Firm* — McCoy Russell LLP

(57) ABSTRACT

A method and a device for buffering containers in a container treatment system are disclosed. The containers enter into storage on an infeed conveyor belt in the infeed direction, are moved in a single row onto a transversely adjoining buffer area by rail-guided and individually driven shuttles with row pushers in a buffering direction running transverse to the infeed direction, and are removed from storage on an outfeed conveyor belt transversely adjoining in the buffering direction. The shuttles and the infeed/outfeed conveyor belts are controlled in dependence of target positions, target speeds and/or target accelerations stored specifically for the container type, and/or the shuttles are controlled in dependence of target positions, target distances and/or target speeds stored specifically for modes of operation for initializing and reading out the shuttles, for following preceding shuttles, and for moving to route positions.

20 Claims, 5 Drawing Sheets

(58) Field of Classification Search
USPC .......................... 198/347.1, 347.4, 430, 432
See application file for complete search history.

(56) References Cited

U.S. PATENT DOCUMENTS

| | | | |
|---|---|---|---|
| 2,825,491 A | | 3/1958 | Engstrom |
| 3,572,383 A | | 3/1971 | Natalizia |
| 6,170,634 B1 | * | 1/2001 | Jaquet .................. B65G 17/002 198/465.1 |
| 6,398,005 B1 | * | 6/2002 | Patrito .................. B65G 35/06 198/347.4 |
| 6,609,605 B1 | * | 8/2003 | Linder ............... B65G 47/5104 198/347.4 |
| 6,782,990 B2 | * | 8/2004 | Joutsjoki ................ B65G 47/71 198/606 |
| 6,910,348 B2 | | 6/2005 | Ugolini |
| 9,505,562 B2 | * | 11/2016 | Petrovic ............... B65G 37/00 |
| 2003/0230941 A1 | | 12/2003 | Jacobs |
| 2008/0148965 A1 | | 6/2008 | Bravo et al. |
| 2015/0291367 A1 | * | 10/2015 | Petrovic ................ B65G 37/00 198/347.1 |
| 2017/0001810 A1 | * | 1/2017 | Gehin ............... B65G 47/5131 |

FOREIGN PATENT DOCUMENTS

| | | | | |
|---|---|---|---|---|
| DE | 1432504 A1 | | 3/1969 | |
| DE | 102018106245 A1 | | 9/2019 | |
| DE | 102018211859 A1 | | 1/2020 | |
| EP | 0077910 A1 | | 5/1983 | |
| EP | 2215912 A1 | | 8/2010 | |
| EP | 2380830 A1 | | 10/2011 | |
| FR | 3047981 | * | 8/2017 | ........... B65G 47/681 |
| FR | 3075768 | * | 6/2019 | ............. B65G 54/02 |
| FR | 3075768 A1 | | 6/2019 | |
| GB | 2569652 A | | 6/2019 | |
| JP | H03256803 A | | 11/1991 | |
| JP | 2006282280 A2 | | 10/2006 | |
| JP | 2017109744 A2 | | 6/2017 | |
| JP | 2019511980 A | | 5/2019 | |
| JP | 2019112092 A | | 7/2019 | |
| NL | 8302466 A | | 2/1985 | |
| WO | 2015036194 A1 | | 3/2015 | |
| WO | 2016012229 A2 | | 1/2016 | |
| WO | 2019067891 A1 | | 4/2019 | |
| WO | 2019228901 A1 | | 12/2019 | |

* cited by examiner

METHOD AND DEVICE FOR BUFFERING CONTAINERS

CROSS REFERENCE TO RELATED APPLICATION

The present application claims priority to German Patent Application No. 102020207679.0 filed on Jun. 22, 2020. The entire contents of the above-listed application is hereby incorporated by reference for all purposes.

TECHNICAL FIELD

The present disclosure relates to a method and a device for buffering containers in a container treatment system.

BACKGROUND AND SUMMARY

A generic method and a generic device are known from DE 10 2018 211 859 A1. According thereto, single-row groups of containers, for example, consisting of beverage bottles, can be pushed over a buffer area without back pressure by way of transversely aligned row pushers. In connection with a container infeed and a container outfeed, each oriented transverse to the buffering direction, a buffer device is thus obtained which can buffer flow of containers with efficient use of space, for example, according to the first-in-first-out principle.

However, the adaptation of the method and the device to different types of containers and the optimization with regard to different operating states, for example, when initializing the transport system, when moving to individual route positions on the transport system, and/or during the follow operation, in which individual shuttles are to follow preceding shuttles in an automated manner at a certain distance from one another, has proven particularly problematic For example, it would be desirable to adapt the sequences of motion of the shuttles, existing infeed conveyor belts, and/or outfeed conveyor belts, in particular their acceleration ramps and/or deceleration ramps, to the types of containers to be processed in order to, firstly, be able to carry out the processes of entry into storage, buffering, and removal from storage as quickly as possible and, secondly, to not damage the containers and to prevent the container from falling over.

The object posed is satisfied by a method and a device disclosed herein.

The method is used to buffer containers grouped in a single row in a container treatment system, in particular in a filling system. For this purpose, the containers are entered into storage on at least one infeed conveyor belt in the infeed direction, moved in a single row on a transversely adjoining buffer area by rail-guided and individually driven shuttles with row pushers in a buffering direction running transverse to the infeed direction, i.e. while maintaining a spatial separation between individual rows of containers, and are removed from storage on at least one outfeed conveyor belt transversely adjoining in the buffering direction.

According to the present disclosure, the shuttles, the infeed conveyor belt, and the outfeed conveyor belt are controlled in dependence of target positions, target speeds, and/or target accelerations stored specifically for the format and/or material of the containers. Additionally or alternatively, the shuttles are controlled in dependence of target positions, target distances, and/or target speeds stored specifically for modes of operation for initializing and in particular reading out the shuttles, for following preceding shuttles, and for moving to route positions.

In this way, the motion profiles of the shuttles, the infeed conveyor belt, and the outfeed conveyor belt can be optimized such that the containers move to their respective target positions as quickly as possible when entered into storage, buffered, and removed from storage and, at the same time, inadmissible back pressure of the containers and/or the containers falling over can be prevented. For example, the tilting behavior of individual types of containers can differ from one another, so that the individual types of containers can be accelerated/decelerated at different speeds when entered into storage, buffered, and removed from storage before the risk of the containers falling over becomes too great. Accordingly, acceleration ramps and deceleration ramps of the infeed conveyor belt and the outfeed conveyor belt can be optimized in dependence of the respective type of container, as can the associated maximum container speeds.

The shuttles may be controlled by way of a higher level open-loop master controller for specifying motion parameters of the shuttles, such as target positions, target speeds, and/or target decelerations, and lower level closed-loop slave controllers available on the shuttles for closed-loop control of the drives of the shuttles on the basis of the parameterization carried out in this way by the open-loop master controller. In at least one example, one or more of the open-loop master controller and the closed-loop slave controllers may comprise instructions stored in non-transitory memory for carrying out the example methods described herein. For example, the instructions stored in non-transitory memory may enable one or both of the open-loop master controller and the closed-loop slave controllers to receive one or more parameters and may actuate one or more components (e.g., conveyor belts and shuttles) based on the one or more parameters.

In at least one example, maximum values for the deceleration and/or acceleration and/or speed of the infeed conveyor belt and/or outfeed conveyor belt and/or the shuttles are calculated from at least one of the following parameters specifically for the types of containers to be processed and stored retrievable for specific types of containers: height, weight, center of gravity, tilt angle, material, envelope contour, base geometry, nominal filling height, and/or material of the type of container. The calculation and/or the retrieval of the maximum values takes place in particular taking into account at least one friction coefficient of the infeed conveyor belt, the outfeed conveyor belt, the buffer area, a conveyor belt upstream of the infeed conveyor belt, and/or a conveyor belt downstream of the outfeed belt.

The motion profiles of the shuttles, and/or the infeed conveyor belt, and/or the outfeed conveyor belt, in particular their acceleration ramps and/or deceleration ramps, can then be specifically optimized to the properties of the containers and/or the conveying surfaces involved, for example, the infeed conveyor belt, the outfeed conveyor belt, and the buffer area.

Such optimization is possible, for example, when the method is carried out for the first time/when the associated device is put into operation, as well as during ongoing operation for format changes, after maintenance measures or the like.

The motion profiles of the containers when entered into storage, buffered, and removed from storage can be flexibly and, if necessary, dynamically adapted to the properties of the containers and the infeed conveyor belt/the outfeed conveyor belt/the buffer area.

The values of the parameters used to calculate the maximum values may be determined from measurements on the containers of the respective type of container in the container treatment system, retrieved from a database with container properties, and/or on the basis of statistical evaluations of treatment results with that type of container in container treatment systems previously commissioned.

As a result, the motion profiles of the containers when entered into storage, buffered, and removed from storage can be optimized both specifically for the respective buffer device as well as on the basis of unspecific data in this regard and/or experience gained with comparable container treatment systems.

For example, the data used for the parameterization of the motion profiles can be specified more precisely on a statistical basis with an increasing number of buffer devices in operation or container treatment systems equipped therewith, thereby increasing the informative value of the underlying calculations, for example, already during initial operation.

The target positions, target speeds, target accelerations, and/or target decelerations of the shuttles, the infeed conveyor belt, and the outfeed conveyor belt may be determined on the basis of the maximum values calculated and in particular compared with target positions, target speeds, target accelerations, and/or target decelerations of the containers in upstream and/or downstream transport routes and/or distribution units for the containers.

Practicable motion profiles of the containers can thus be adapted for different types of containers and/or different modes of operation, taking into account the maximum values and subject to a performance optimization for the entry into storage, buffering, and removal from storage.

A comparison of the target values determined in this manner to corresponding target values of upstream and/or downstream transport routes/distribution units enables a plausibility check of the motion profiles determined and prevents punctual overcapacities and/or undercapacities with respect to treatment units of the container treatment system connected upstream and/or downstream. The entry of the containers into storage, their buffering, and removal from storage can be adapted, for example, with respect to a machine block arranged upstream for producing, filling, and equipping the containers and at least one packaging machine and/or order picking system arranged downstream. In this way, the flow of containers can be flexibly adapted to the required production output in the sense of a uniform and continuous production by electronic control of the entry into storage, buffering, and removal from storage.

Differences between the target speeds, target accelerations, and/or target decelerations determined for the shuttles, the infeed conveyor belt, and/or the outfeed conveyor belt and those in the upstream and/or downstream transport routes and/or distribution units are then may be reduced and in particular minimized by an adaptation that is specific to the respective type of container.

As a result, overcapacities in performance of individual method steps or the device components used for this can be prevented both within the buffer device as well as in interaction with upstream/downstream transport routes, distribution units, and/or treatment units. For example, safety reserves that are not required with regard to mechanical requirements, electrical supply power, space requirements, and/or media consumption can be reduced in this way in order to thus minimize manufacturing costs as well as operating costs.

The method and the device can be specifically adapted to the processing of certain filling goods and/or container formats and successively optimized, for example on the basis of a database that is continuously refined by way of statistical analysis of individual bulk goods and/or container formats.

The shuttles may themselves regulate in a decentralized manner their speed and/or their distance from one another and/or the movement to the target positions specified for them in dependence of operating states that are transmitted to the shuttles by an open-loop master controller. The operating states comprise at least one automated initialization operation for moving to a route zero point and/or for assigning an identity/address to the shuttles, a follow operation for moving up shuttles in an automated manner behind preceding shuttles, and a positioning operation for moving to target positions specified by the open-loop master controller in the sense of absolute route positions.

The shuttles can then adapt to a specific operating situation and control task, even in different operating states. For this purpose, each shuttle comprises an independent closed-loop control in the sense of a controller or the like for regulating the predetermined motion patterns/travel profiles of the shuttles.

For example, the shuttles can independently verify at what actual route position and/or at what actual distance from a shuttle traveling ahead they are and adapt such actual values by independently regulating the corresponding target values specified by the open-loop master controller.

At one of the target positions during the initial operation and/or after a predetermined number of buffer cycles, in particular after each buffer cycle, the shuttles may switch to the initialization operation in which the shuttles are zeroed with respect to the route zero point and/or are assigned an identity by the open-loop master controller. As a result, the shuttles can independently determine their route positions with respect to the zero point and, for example, compare them with route positions of other shuttles identified in this manner, in particular for distance regulation with regard to shuttles running ahead.

The shuttles can then be named for individual buffer cycles regardless of their previous history and thus line up flexibly in a sequence of shuttles. For example, individual shuttles could have been integrated from an empty shuttle buffer into the sequence for the next buffer cycle prior to initialization, for example, following a maintenance measure and/or to balance buffer capacities in dependence of the number of shuttles required for the next buffer cycle. For example, worn or defective shuttles could be discharged and/or introduced at a track switch.

Due to the initialization/naming of the shuttles and the position zeros, the operation for entry into storage, buffering, and removal from storage in the next buffer cycle is substantially independent of the number and the manufacturing identity of the shuttles. They can therefore be exchanged with one another as required and, through the initialization, receive an electronic identity suitable for the next buffer cycle. In this way, entry into storage, buffering and removal from storage are each possible independently of the shuttles that are present in the respective buffer device. In other words, when shuttles are removed and/or added, the production operation can either continue to run or does not require any retooling work with regard to the subsequent control of the method and the device.

In the initialization operation, information relating to the operating time performed and/or the distance traveled by individual shuttles and/or wear indicators for individual shuttles may be exchanged between the shuttles and the open-loop master controller. The shuttles are then read out in this regard, for example, at an initialization station, and the associated data is transmitted to the open-loop master controller.

For example, travel distances and/or operating hours of individual shuttles can then be added up and an advance failure detection can be performed as predictively as possible on this basis in order to prevent production downtimes due to defective shuttles.

In addition, for example, vibration sensors on the rails of the transport system could be used to obtain information regarding the wear status of individual chassis rollers of the shuttles in order to draw conclusions about a wear status of the respective shuttle. Such status monitoring could also be carried out on other conveying mechanisms, for example, bearings of the infeed conveyor belt, outfeed conveyor belt or the like. For example, gears could be monitored with regard to the wear on roller bearings that are present thereon.

In addition, for example, the drive current of individual shuttles and/or the infeed conveyor belt and/or the outfeed conveyor belt could be monitored and compared with the respective initial/delivery state in order to draw conclusions about any wear and tear on the respective drives.

In this context, the respective quality of the data transmission could also be monitored in terms of minimum and maximum transmission rates, for example, in order to draw conclusions about the wear and tear of electrical sliding tracks and/or sliding collectors or similar electrical contacts. Maintenance cycles could be determined based thereupon, for example, for electrical contacts, mechanical roller bearings, and/or running surfaces.

In the initialization operation, the open-loop master controller may also issues an operator recommendation to remove shuttles that have been recognized as being worn or defective from the transport system and/or triggers an automated discharge of such shuttles. This minimizes production downtimes, where production operations can continue unhindered due to automated position zeroing and the assignment of electronic identities/addresses to the shuttles, even when individual shuttles are discharged/removed.

The open-loop master controller may transmit to the closed-loop slave controllers of the shuttles target positions that are dependent on operating states and/or malfunction states and/or container properties for starting or exiting the follow operation, in particular with ongoing adjustment of the target positions to changes in operating states, malfunction states, and/or container properties.

As a result, the shuttles can be switched to the follow operation in a selective manner, for example, in dependence of the degree of the buffer area filling up, and can, for example, continue it until they reach the outfeed region. The shuttles can then be moved relatively quickly and continuously across the buffer area until the follow operation begins. This likewise applies to the return of the emptied shuttles to a section of the transport system designed as an empty shuttle buffer or to the shuttles moving up there.

In at least one example, the open-loop master controller transmits to the closed-loop slave controllers of the shuttles target positions dependent on operating states and/or malfunction states and/or container properties for starting or exiting the positioning operation and/or target positions for route positions to be move to in the positioning operation. The target positions may there be continuously adapted to changes in the operating states, malfunction states, and/or container properties.

As a result, individual route positions can be selectively approached to the respective route positions during entry into storage, and/or removal from storage, for example, in dependence of the respective container format and a dimension of the row pushers in the buffering direction possibly adapted thereto. Certain target positions can also be specified for shuttles recognized as being worn or defective, for example, in order to discharge them in a selective manner from the transport system. Certain route positions could also be specified in order to park the shuttles at suitable route positions in the event of an emergency stop.

The device is used to buffer containers grouped in a single row in a container treatment system, in particular in a filling system. The device comprises an infeed region with at least one infeed conveyor belt, an outfeed region with at least one outfeed conveyor belt, a buffer area extending therebetween transverse in the buffering direction, and a transport system arranged thereabove, that comprise shuttles guided on rails and driven independently of one another with row pushers aligned transverse to the buffering direction and present thereon in particular in pairs for moving the container in a single row on the buffer area from the infeed region to the outfeed region.

According to the present disclosure, the device comprises a control system for controlling the shuttles, the infeed conveyor belt, and the outfeed conveyor belt in dependence of target positions, target speeds, and/or target accelerations stored specifically for the format and/or material of the containers. Additionally or alternatively, the control system is configured to control the shuttles in dependence of target positions, target distances, and/or target speeds stored specifically for modes of operation for initializing and in particular reading out the shuttles, for following preceding shuttles, and for moving to route positions.

The advantages can be obtained with the example methods described herein.

The control system may comprise: closed-loop slave controllers arranged on the shuttles for the drives of the shuttles; and an open-loop master controller for parameterization of the closed-loop slave controllers specifically for the mode of operation for operating states comprising at least one automated initialization operation for moving to a route zero point and/or for assigning an electronic identity/address to the shuttles, a follow operation for moving up the shuttles in an automated manner behind preceding shuttles, and a positioning operation for moving to route positions specified by the open-loop master controller.

The advantages can be obtained with the example devices described herein.

The device may further comprise an initialization station arranged in the region of the transport system for zeroing the position of the shuttles and/or for assigning an electronic identity issued by the open-loop master controller to the shuttles and/or for reading out an operating time performed and/or travel route of individual shuttles and/or for reading out wear indicators of individual shuttles for the open-loop master controller.

The shuttles can thereby be integrated into a sequence of shuttles required for the next buffer cycle, for example, during the initial installation, after a predetermined number of buffer cycles and in particular with each individual buffer cycle, regardless of the previous history of the individual shuttles, or also possibly be discharged in dependence of a degree of wear and tear or of defects from the sequence of shuttles and therefore from the transport system and returned after maintenance. Wear indicators can also be transmitted to the open-loop master controller for advance failure detection and for avoiding production downtimes due to defects.

The row pushers may comprise guide channels, which run transverse to the buffering direction and are defined both in and opposite to the buffering direction, for receiving the containers in respective single rows. As a result, the containers can each be moved in a single row, separated from one another, on the buffer area and secured against falling over within the guide channels both in the buffering direction and opposite to the buffering direction.

This enables comparatively steep acceleration ramps and deceleration ramps to be specified in the buffering direction. During the entry into storage and the removal therefrom, the containers then run substantially transverse to the buffering direction in the guide channels.

The control system is configured in particular to carry out the open-loop control functions/closed-loop control functions described with regard to the method and for this purpose comprises the open-loop master controller described and closed-loop slave controllers formed on the shuttles for carrying out/controlling an independent drive operation of the shuttles on the basis of parameterization by the open-loop master controller.

For example, the control system can comprise a processing unit for determining maximum values for the deceleration and/or acceleration and/or speed of the infeed conveyor belt and/or outfeed conveyor belt from at least one of the following parameters specifically for types of containers to be processed: height, weight, center of gravity, tilt angle, material, envelope curve, base geometry, nominal filling level and/or material of the container, where in particular friction coefficients of the infeed conveyor belt, the outfeed conveyor belt, the buffer area, a conveyor belt upstream of the infeed conveyor belt, and/or a conveyor belt downstream of the outfeed belt are stored in the processing unit or an associated data memory.

The open-loop master controller can then, for example, itself comprise a corresponding memory for storing such parameter values and/or be connected to a database for retrieving such parameter values. Furthermore, the processing unit can carry out statistical evaluations relating to the values of the parameters that were obtained from previous operation of comparable devices/container treatment systems.

The open-loop master controller can comprise, for example, associated input units and output units, for example, a man-machine interface, such as a touchscreen or the like, on which the associated parameters can possibly be viewed and/or entered.

BRIEF DESCRIPTION OF THE FIGURES

An example embodiment of the present disclosure is illustrated by drawing, where.

DETAILED DESCRIPTION

Figure 1:
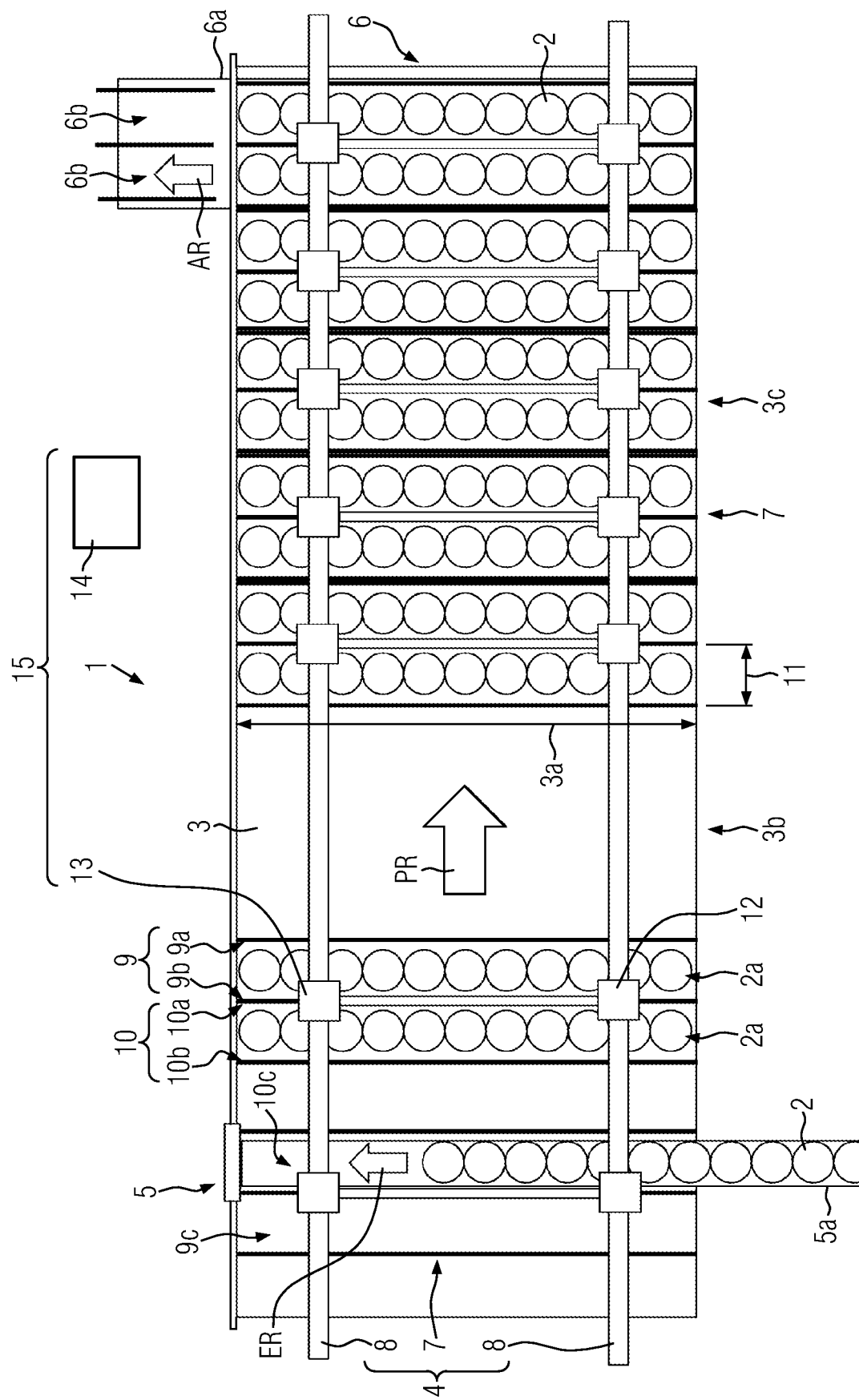
FIG. 1 shows a schematic top view onto the device.
Figure 2:
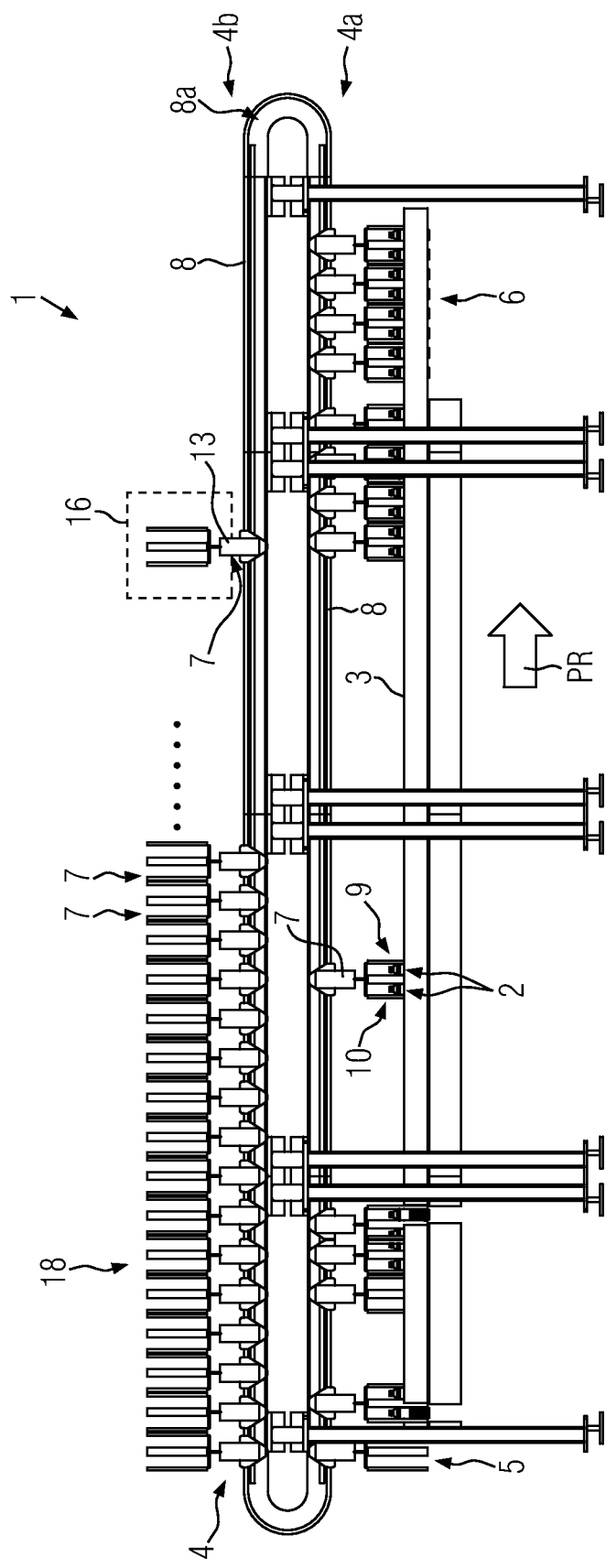
FIG. 2 shows a side view of the device.

As can be seen in FIG. 1 and FIG. 2, device 1 for buffering containers 2/rows of containers 2a grouped in a single row comprises a substantially horizontal and stationary buffer area 3 as well as a transport system 4 arranged thereabove for moving containers 2/rows of containers 2a on buffer area 3 in a buffering direction PR from an infeed region 5 with at least one infeed conveyor belt 5a to an outfeed region 6 with at least one outfeed conveyor belt 6a. Containers 2 are, for example, bottles.

At least one infeed conveyor belt 5a runs in an infeed direction ER and outfeed conveyor belt 6a in an outfeed direction AR, each transverse and in particular orthogonal to buffering direction PR of transport system 4.

Transport system 4 comprises independently driven shuttles 7 and rails 8 configured as a closed circulation path along which shuttles 7 run.

Shuttles 7 may comprise at least one row pusher 9 being anterior (viewed in buffering direction PR) and one row pusher 10 being posterior in this regard. Shuttles 7, however, could also each comprise only one of row pushers 9, 10.

Row pushers 9, 10 arranged consecutively in the buffering direction on shuttle 7 can also be viewed as twin row pushers. Each row pusher 9, 10 is configured to receive containers 2 in a single row, i.e. a respective row of containers 2a spatially separated in buffering direction PR, and is oriented transverse, in particular orthogonally, to buffering direction PR. Row pushers 9, 10 can therefore also be viewed as buffer lines, that are movable in buffering direction PR and spatially separated from one another, for the individual groups of containers 2a.

Row pushers 9, 10 are configured for the respective leading and trailing guidance of containers 2 grouped in a single row and therefore for their guidance both in buffering direction PR, i.e. when they are advanced in buffering direction PR, for example, when accelerating the advancement, as well as opposite to buffering direction PR, in particular when decelerating the advancement.

Row pushers 9, 10 for this purpose each comprise an anterior row guide 9a, 10a leading containers 2 and a posterior row guide 9b, 10b trailing containers 2, as well as guide channels 9c, 10c defined by the former for receiving and guiding containers 2/individual rows of containers 2a on both sides. Posterior row guide 9b and anterior row guide 10a can be formed arranged fixedly relative to one another on shuttle 7 or can also be formed integrally.

Row pushers 9, 10 or their guide channels 9c, 10c, respectively, each have a clear width 11 defined between anterior row guide 9a, 10a and posterior row guide 9b, 10b which can be adapted to the respective container width/the respective container diameter (not shown).

Shuttles 7 each comprise a drive 12 for the individual movement along rails 8 and an individual closed-loop slave controller 13 (only shown in separate regions of a shuttle 7 for the sake of clarity in FIG. 1), which is parametrized by an open-loop master controller 14 present on the device 1 and which, based thereupon, is configured for autonomous closed-loop control of associated drive 12.

Open-loop master controller 14 and closed-loop slave controller 13 are components of a control system 15 which, for example, can comprise further units (not shown) for controlling infeed conveyor belt 5a and outfeed conveyor belt 6a.

Control system 15 may further comprises an initialization station 16 which is arranged in the region of transport device 4. As can be seen in FIG. 2 in this regard, transport device 4 comprises a lower transport level 4a in which row pushers 9, 10 with containers 2 are moved over buffer area 3 in buffering direction PR, and an upper transport level 4b in which emptied shuttles 7 again return in a direction opposite to buffering direction PR and may be upside down from outfeed region 6 to infeed region 5.

Initialization station 16 may be located in upper transport level 4b and in the region of a route zero point 17 at which individual shuttles 7 are zeroed during the initial operation, after a predetermined number of buffer cycles, and/or with each buffer cycle with respect to route zero point 17 in the sense of a reference point for the subsequent route travel. This serves to assign individual route positions along rails 8 in order to initiate certain sequences of motions of shuttles 7 at the route positions, as shall be described in detail in FIG. 3 by way of example.

Also indicated schematically in upper transport level 4b is an empty shuttle buffer 18 in which previously emptied shuttles 7 are waiting for a new buffer cycle and for this purpose move up in an automated manner one after the other in a follow operation, which shall be described below.

Row pushers 9, 10 may extend substantially over entire width 3a of buffer area 3 and may have a width (transverse to buffering direction PR) of 3 to 6 m, in particular of 4 to 5.5 m.

Drives 12 of shuttles 7 are each independent of one another and can, for example, be a linear motor drive or a servo motor (not shown in detail), so that individual shuttles 7 can be driven independently of one another at different speeds along rails 8.

Individual shuttles 7 can therefore in principle be moved to any route positions on the circulation path defined by rails 8 and, for example, be positioned there. For this purpose, shuttles 7 can be accelerated and decelerated independently of one another. Certain modes of operation of shuttles 7 can also be initiated at certain route positions, for example, an initialization operation for initializing and/or reading out shuttles 7, a follow operation for moving up a certain shuttle 7 in an automated manner behind preceding shuttles 7, and a positioning operation for moving to target positions 19 predetermined by open-loop master controller 14 with shuttle 7, as shall be described below with reference to FIG. 3.

The distances between individual shuttles 7 can be changed with control system 15, for example, to traverse empty regions of buffer area 3. A sequence of several shuttles 7, however, can instead also be moved at a constant target distance 20 relative to one another, for example, when shuttles 7 move up to a filled region of buffer area 3 toward outfeed region 6. This is also indicated schematically in FIG. 3.

Shuttles 7 can be configured as runners of linear motors, the active components of which may then be arranged on rails 8. Accordingly, shuttles 7 would then be equipped with associated permanent magnets. With long stators, they form individual drives for individual shuttles 7, as is known.

Instead, however, other drives 12 are also conceivable on shuttles 12, for example, servomotors with drive pinions that can run along a toothing that is formed along rails 8 (neither shown). The chasses of shuttles 7 can comprise guide and running rollers (not shown) which interact with rails 8 in a known manner.

The drive energy could be transmitted to the servomotors or similar drives 12 of the shuttles in a contactless manner, i.e. without conductor lines, as well as by way of sliding contacts or the like.

Shuttles 7 can also have energy stores for their individual drives 12, such as power capacitors, batteries or the like. In this way, peaks in the power consumption can be compensated for, for example, when accelerating shuttles 7, or an energy supply can be maintained in sections of rails 8 in which no permanent energy feed from a stationary energy source is possible.

Data transmission in control system 15 with regard to shuttles 7 can be effected by way of leakage waveguides and/or in a radio-supported manner, for example, by way of wireless LAN.

Figure 3:
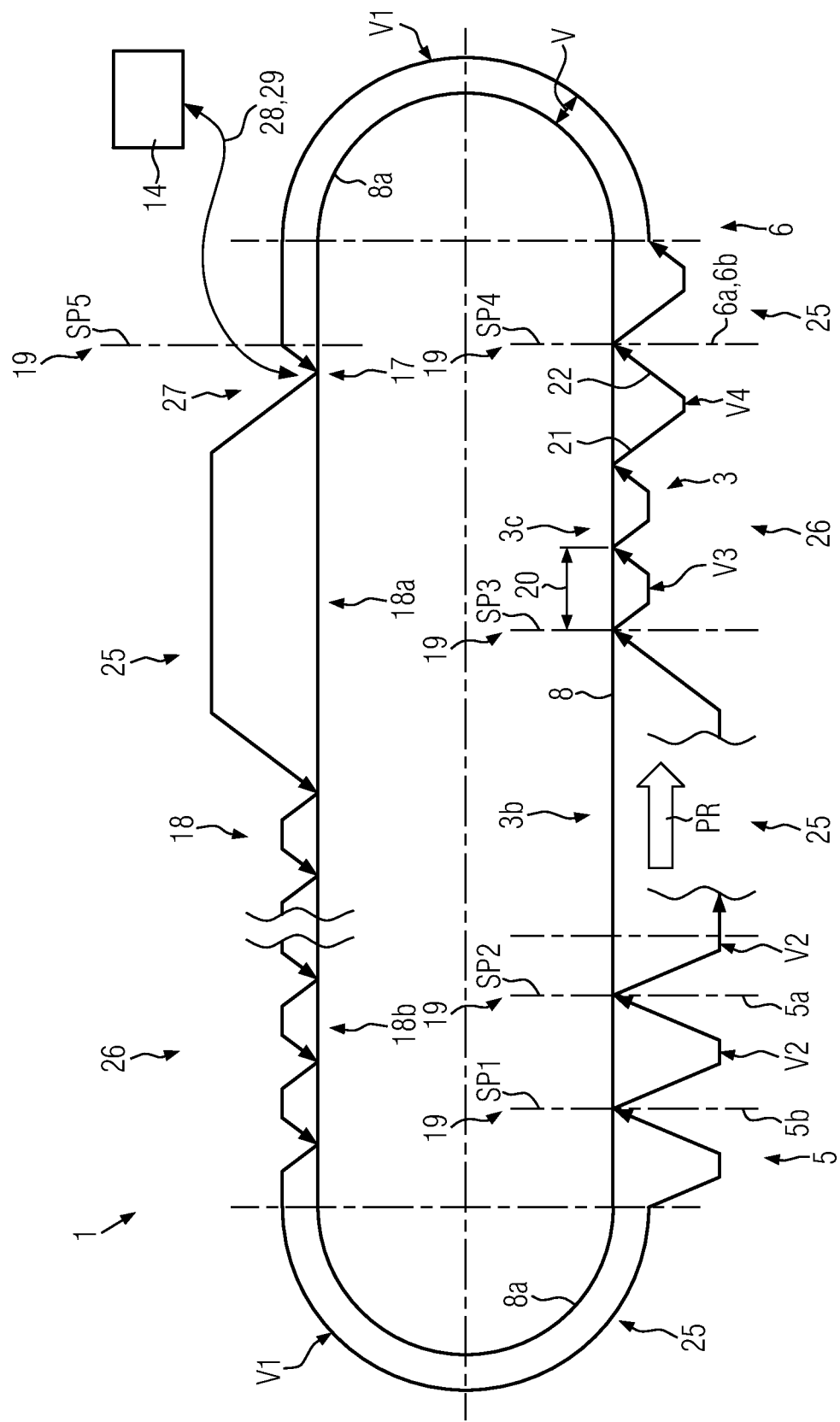
FIG. 3 shows motion profiles of the shuttles when circulating on the transport system.

FIG. 3 illustrates schematically motion profiles (not shown in FIG. 2 for the sake of clarity) of shuttles 7 while circulating on rails 8. Advance speed V of shuttles 7 is shown for this purpose schematically as an orthogonal curve distance from the respective direction of motion of shuttles 7 along rails 8.

According thereto, waiting empty shuttles 7 move up to infeed region 5, for example, at a first target speed V1, are there accelerated to a second target speed V2, and decelerated such that they initially come to a standstill above an infeed conveyor belt 5b being posterior (as viewed in buffering direction PR). Respective anterior row pushers 9 are there populated with containers 2 in a single row.

For subsequently moving to an infeed conveyor belt 5a being anterior (as viewed in buffering direction PR), shuttles 7 are again accelerated to second target speed V2 and then decelerated again to a standstill. Posterior row pushers 10 are populated with containers 2 in a single row from anterior infeed conveyor belt 5a.

Second target speed V2 may be greater than first target speed V1, as a result of which the entry into storage is accelerated and, if necessary, can be adapted to the conveying speed of the arriving flow of containers.

It is also shown by way of example that shuttles 7 are in the region of posterior infeed conveyor belt 5b at a first route position SP1 and stopped there, in the region of anterior infeed conveyor belt 5a at a second route position SP2.

Route positions SP1, SP2 are each assigned a target position 19 by open-loop master controller 14. Target position 19 can be adapted, for example, in dependence of the container diameter. For example, when the container diameter to be buffered is reduced, target position 19 could be moved in buffering direction PR so that the advance position of guide channel 9c, 10c to be populated is aligned with infeed conveyor belt 5a, 5b. It would also be conceivable to enter the containers into storage with only one of infeed conveyor belts 5a, 5b, so that first or second route position SP1, SP2 is not moved to and therefore no target position 19 is assigned to the latter.

Such adaptations of individual target positions 19 for certain route positions SP1, SP2 can in principle be adapted by control system 15 to any container properties and/or modes of operation of device 1.

Also shown schematically in FIG. 3 are target distances 20 between successive shuttles 7 when moving up on buffer area 3 towards outfeed region 6 and/or when moving up empty shuttles 7 in the region of empty shuttle buffer 18.

Target accelerations 21 and target decelerations 22 in the sense of acceleration ramps and deceleration ramps between individual target speeds V1 to V4 and/or standstill V0 are also shown only by way of example.

Different target accelerations 21 and/or target decelerations 22 could also be specified by open-loop master controller 14 along the circulation path. Target accelerations 21 and/or target decelerations 22 are generally based on container properties, such as the height, weight, center of gravity, tilt angle, material, envelope contour, base geometry, nominal filling height, and/or material of the respective type of container of containers 2 and/or the friction coefficient of Infeed conveyor belt 5a, 5b, outfeed conveyor belt 6a, buffer area 3, and/or conveyor belts upstream of infeed conveyor belt 5a, 5b/downstream of outfeed conveyor belt 6a.

For example, depending on the type of container and the properties of the individual conveying devices, it can therefore be useful to specify a uniform target acceleration 21 and/or target deceleration 22 for several conveyor belts or target accelerations 21 and/or target decelerations 22 specifically adapted to the respective combinations of container 2 and the conveyor belt.

In particular, target accelerations 21 and/or target decelerations 22 can be specified in a flexible software-controlled manner by open-loop master controller 14 in dependence of the properties of a specific type of container and specified to closed-loop slave controllers 13 of shuttles 7 in the sense of a parameterization of the respective sequences of motions. The individual sequences of motions are then regulated in closed-loop slave controllers 13 of shuttles 7 within the framework of the specified parameterization.

Two-sided row pushers 9, 10, namely leading and trailing ones, there ensure that containers 2/rows of containers 2a received by the former can be carried along in buffering direction PR and positioned precisely and largely secured against falling over both when accelerating and when decelerating shuttles 7.

Nevertheless, it can be useful to limit the target acceleration 21 and/or target deceleration 22 of shuttles 7, or to specify it according to the type of container, so as not to mechanically overload containers 2 when accelerating/decelerating.

Infeed conveyor belt 5a, 5b may be operated at a target speed VE, and outfeed conveyor belt at a target speed VA. If intermittent operation of infeed conveyor belt 5a, 5b and/or outfeed conveyor belt 6a is required during entry into storage/retrieval therefrom, a target acceleration 23 and/or target deceleration 24 may be specified by open-loop master controller 14 for this purpose. This as well can be flexibly adapted in a software-controlled manner to the respective type of container and/or its material pairing with infeed conveyor belt 5a, 5b and/or outfeed conveyor belt 6a.

According to FIG. 3, when shuttles 7 are subsequently driven over an empty buffer region 3b of buffer area 3, they may be accelerated again to second target speed V2 and therewith moved to a buffer region 3c of buffer area 3 occupied by shuttles 7 and are decelerated to be connected to populated shuttles 7 already positioned there.

For this purpose, the beginning of occupied buffer region 3c of buffer area 3 can be assigned a target position 19 by open-loop master controller 14, for example, in that the filling of buffer area 3 is monitored by sensors and open-loop master controller 14 receives information about where occupied buffer region 3c begins when shuttle 7 arrives.

Accordingly, shuttle 7 travels through empty buffer region 3b to the beginning of occupied buffer region 3c, i.e. up to determined target position 19, in a positioning operation 25 up to a route position SP3 at the transition from empty buffer region 3b to occupied buffer region 3c. Target position 19 then corresponds substantially to third route position SP3. At target position 19, shuttle 7 then changes from positioning operation 25 to an automated follow operation 26 in which the shuttle follows respective preceding shuttle 7 while maintaining target distance 20.

Follow operation 26 is then maintained, for example, until respective shuttle 7 reaches outfeed region 6, the beginning of which, for example, is assigned a further target position 19. At this point, shuttle 7 would then switch back to a positioning operation 25 in order to therewith move to a fourth route position SP4 in which shuttle 7 is stopped for the removal of containers 2 from associated row pushers 9, 10.

Target distance 20 can depend, for example, on clear width 11 of guide channels 9c, 10c and is accordingly specified by open-loop master controller 14 in the sense of a parameterization to closed-loop slave controllers 13 of shuttles 7. In occupied buffer region 3c, shuttles 7 then move up, in particular in a step-by-step manner, at a third target speed V3 toward outfeed region 6, for example, while maintaining target distance 20.

Third target speed V3 in occupied buffer region 3c can be lower than first target speed V1 in the infeed region and second target speed V2 in empty buffer region 3b.

For the removal from storage, shuttles 7 are accelerated, for example, to a fourth target speed V4 and then decelerated to a standstill V0 above associated outfeed conveyor belt 6a. Outfeed conveyor belt 6a can there stand still and then be selectively accelerated for the removal from storage or it can also run continuously.

Depending on the drive of outfeed conveyor belt 6a, row pushers 9, 10 can be positioned in alignment with respectively associated transport aisles 6b. For example, containers 2/rows of containers 2a can exit selectively transverse to buffering direction PR from guide channels 9c, 10c of row pushers 9, 10 by a start-stop control of at least one outfeed conveyor belt 6a and then be associated with individual transport aisles 6b arranged adjacently. A separately controllable/driven outfeed conveyor belt 6a may then be associated with each transport aisle 6b.

However, it is also conceivable to remove containers 2 from storage from guide channels 9c, 10c by way of a continuously running outfeed conveyor belt 6a, by way of an additional acceleration belt running alongside, and/or with the aid of guide rails for merging rows of containers 6a exiting from guide channels 9c, 10c.

Fourth target speed V4 in outfeed region 6 can be, for example, greater than third target speed V3 and lower than second target speed V2.

Emptied shuttles 7 can be driven, for example, at fourth speed V4 up to the end of outfeed region 6 and decelerated there to first speed V1 in order to finally drive the shuttles along a curved segment 8a of rails 8, and may be configured as a clothoid 8a, into upper transport level 4b.

Shuttles 7 could then be moved in the positioning operation to a fifth route position SP5 in the sense of a further target position 19 at which shuttles 7 change from positioning operation 25 to an initialization operation 27.

In initialization operation 27, shuttles 7 are zeroed, for example, with respect to route zero point 17 and/or are assigned an electronic identity 28 by open-loop master controller 14. In initialization operation 27, information 29 relating to the operating time performed and/or the distance traveled by individual shuttles and/or wear indicators for individual shuttles 7 can also be exchanged between closed-loop slave controller 13 of shuttles 7 and open-loop master controller 14.

On this basis, open-loop master controller 14 can issue, for example, an operator recommendation to remove a shuttle 7 that has been recognized as being worn or defective and/or trigger an automated removal of such a shuttle 7.

A track switch can be present for this purpose in upper transport level 4b, for example, to discharge worn/defective shuttles 7 and/or to feed in operational shuttles 7.

Target positions 19 for starting/exiting positioning operation 25, follow operation 26, and initialization operation 27 are transmitted from open-loop master controller 14 to closed-loop slave controllers 13 of shuttles 7 with associated control commands, so that closed-loop slave controllers 13 each independently perform an associated motion pattern and associated data exchange between open-loop master controller 14 and closed-loop slave controllers 13 can take place.

Shuttles 7 pass through empty shuttle buffer 18 in a direction opposite to buffering direction PRR and may be in an upside-down manner with regard to their alignment on buffer area 3, for example, in the follow operation 26.

Empty shuttle buffer 18 generally comprises a receptive buffer region 18*a*, i.e. one that is not occupied with empty shuttles 7, and a buffer region 18*b* occupied with empty shuttles 7. Unoccupied buffer region 18*a* can be traversed, for example, in positioning operation 25 at second target speed V2. To move up in occupied buffer region 18*b*, empty shuttles 7 can again be accelerated step-by-step to third target speed V3 and decelerated to a standstill V0.

Leading and trailing row pushers 9, 10 enable comparatively high target speeds V1 to V4 of populated shuttles 7 with exact positioning of containers 2/rows of containers 2*a* in and opposite to buffering direction PR in guide channels 9*c*, 10*c* while preventing individual containers 2 of rows of containers 2*a* from falling over, both at an associate target acceleration 21 as well as at an associated target decelerating 22 of shuttles 7.

In addition, guide channels 9*c*, 10*c* favor the precise entry into and removal from storage transverse to buffering direction PR, for example, on at least one outfeed conveyor belt 6*a* during the distribution of containers 2/rows of containers 2*a* to different transport aisles 6*b* or similar manipulation of containers 2.

Figure 4:
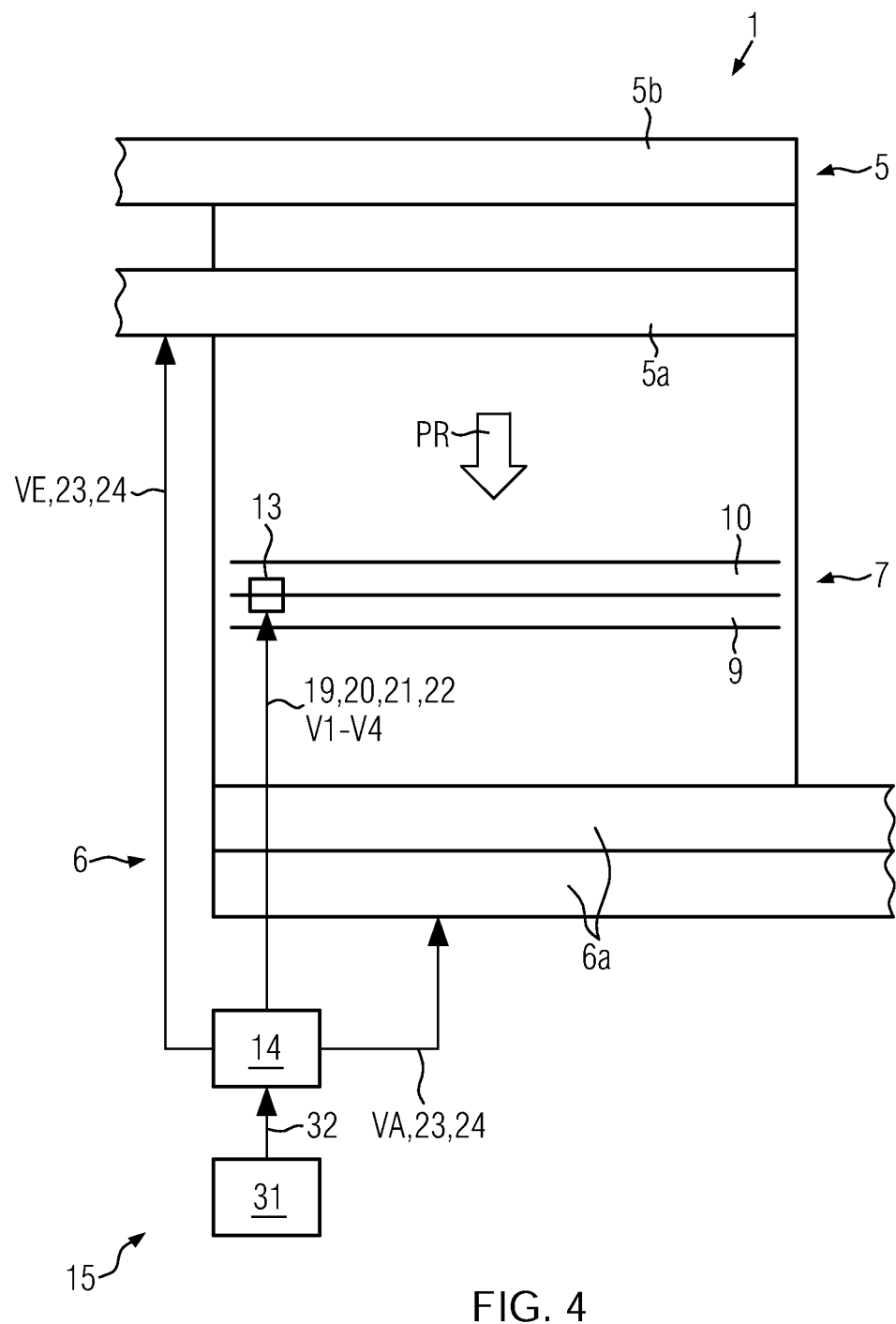
FIG. 4 shows a schematic representation of the control system.

FIG. 4 illustrates schematically control system 15 of device 1 with open-loop master controller 14 and closed-loop slave controllers 13 (only one of which is indicated by way of example).

According thereto, infeed conveyor belts 5*a*, 5*b* are each driven at target speed VE and outfeed conveyor belt 6*a* at target speed VA. Target speeds V1 to V4 of shuttles 7 are set and regulated by closed-loop slave controllers 13 in dependence of target positions 19, target distances 20, and target speeds V1 to V4.

Also indicated is a database 31 in which, for example, measured values, material properties or similar parameters for determining target positions 19, target distances 20, target accelerations 21, 23, target decelerations 22, 24, and target speeds V1 to V4, VE, VA are stored. In particular, database 31 contains information with permissible maximum value 32 for the deceleration, acceleration and/or speed of containers 2 respectively for a certain type of container and/or the respective conveying surfaces of infeed conveyor belt 5*a*, outfeed conveyor belt 6*a*, and buffer area 3.

Such maximum values 32 can be determined, for example, from measurements on containers 2 of the respective type of container in the container treatment system or device 1 and stored in database 31. Database 31 can also comprise container properties that are not directly dependent on device 1 and/or data based on statistical evaluations of treatment outcomes with that type of container in previously commissioned container treatment systems, i.e. data obtained outside respective device 1 or container treatment system.

Figure 5:
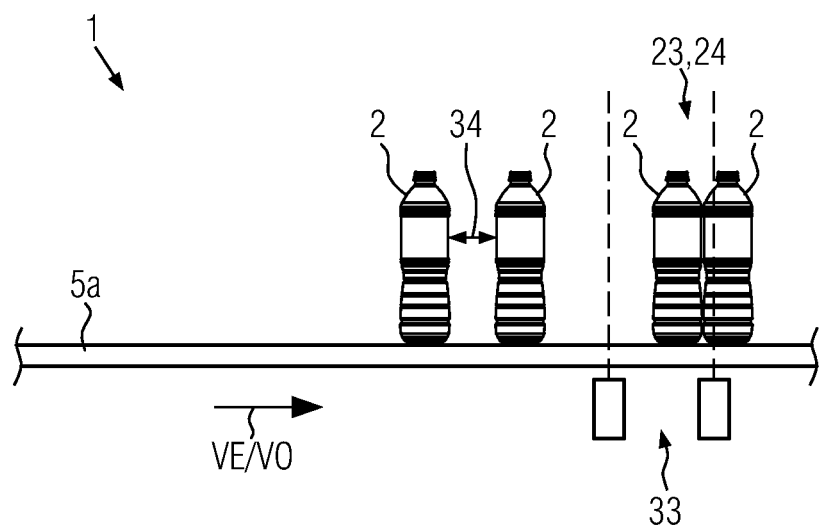
FIG. 5 shows a schematic representation of determining motion parameters.

FIG. 5 shows schematically how, for example, maximum values of the parameters used to calculate the target values can be obtained. According thereto, for example, a gap detection 33 between incoming containers 2 is performed on infeed conveyor belt 5*a* and an evaluation as to whether containers 2 slip relative to one another when infeed conveyor belt 5*a* is decelerated. This means that it is verified whether existing gaps 34 between containers 2 decrease or increase. This can be done at different speeds of infeed conveyor belt 5*a* with decelerating ramps possibly of different steepness or the like between an infeed speed VE and standstill V0. It can be determined therefrom, for example, from which speed and/or acceleration 23 or deceleration 24 of infeed conveyor belt 5*a* a container 2 of a certain type of container begins to slip relative to at least one adjacent container 2.

Such monitoring can take place both in advance, for example, before device 1 is commissioned for the first time, as well as during operation. For example, it can turn out that there is an increased tendency of containers 2 to slip due to contamination of infeed conveyor belt 5*a* and a changed maximum speed and/or maximum deceleration of infeed conveyor belt 5*a* is therefore determined under the current operating conditions.

A target speed VE of infeed conveyor belt 5*a* would then be lowered accordingly for reliable and fault-free operation. Based thereupon, possibly necessary cleaning of infeed conveyor belt 5*a* could possibly also be concluded or similar maintenance measures could be initiated.

Control system 15 enables flexible process optimization for different types of containers with regard to the individual sequences of motion of containers 2 on infeed conveyor belt 5*a*, outfeed conveyor belt 6*a*, and when moving in buffering direction PR in row pushers 9, 10.

The invention claimed is:

1. A method for buffering containers grouped in a single row in a container treatment system, where said containers are entered into storage on at least one infeed conveyor belt in an infeed direction, moved in a single row on a transversely adjoining buffer area by rail-guided and individually driven shuttles with row pushers in a buffering direction running transverse to said infeed direction, and are removed from storage on at least one outfeed conveyor belt transversely adjoining in said buffering direction, wherein said shuttles, said infeed conveyor belt, and said outfeed conveyor belt are controlled in dependence of target positions, target speeds, and/or target accelerations/decelerations stored specifically for a format and/or material of said containers, and/or said shuttles are controlled in dependence of target positions, target distances and/or target speeds stored specifically for modes of operation for initializing said shuttles in a first mode, for said shuttles following preceding shuttles in a second mode, and for moving said shuttles to route positions in a third mode.

2. The method of claim 1, further comprising reading out said shuttles as a part of the first mode.

3. The method according to claim 1, where maximum values for the deceleration and/or acceleration and/or speed of said infeed conveyor belt and/or outfeed conveyor belt and/or said shuttles are calculated from at least one of the following parameters specifically for types of containers to be processed and that are stored as retrievable: height, weight, center of gravity, tilt angle, material, envelope curve, base geometry, nominal filling level and/or material of the type of container.

4. The method according to claim 3, wherein the maximum values for the deceleration and/or acceleration and/or speed of said infeed conveyor belt and/or outfeed conveyor belt and/or said shuttles further take into account at least one friction coefficient of said infeed conveyor belt, said outfeed conveyor belt, said buffer area, a conveyor belt upstream of said infeed conveyor belt, and/or a conveyor belt downstream of said outfeed belt.

5. The method according to claim 3, where values of the parameters used to calculate said maximum values are determined from measurements on said containers of a respective type of the types of containers in said container treatment system, retrieved from a database with container properties, and/or on the basis of statistical evaluations of treatment outcomes with the respective type of container in container treatment systems previously commissioned.

6. The method according to claim 3, where said target positions, target speeds, target accelerations, and/or target decelerations of said shuttles, said infeed conveyor belt, and said outfeed conveyor belt are determined on the basis of said maximum values and compared with target positions, target speeds, target accelerations, and/or target decelerations of said containers in upstream and/or downstream transport routes and/or distribution units for said containers.

7. The method according to claim 6, where differences between said target speeds, target accelerations, and/or target decelerations determined for said shuttles, said infeed conveyor belt (5a), and/or said outfeed conveyor belt (6a) and those in the upstream and/or downstream transport routes and/or distribution units are then reduced, and wherein the differences are minimized by an adaptation that is specific to the respective type of container.

8. The method according to claim 1, where said shuttles themselves regulate in a decentralized manner their speed and/or their distance from one another and/or the movement to said target positions specified for them in dependence of an operating state that is transmitted to said shuttles by an open-loop master controller, comprising at least one automated initialization operation for moving to a route zero point and/or for assigning an electronic identity/address to said shuttles, a follow operation for moving up in an automated manner behind preceding shuttles, and a positioning operation for moving to target positions specified by said open-loop master controller.

9. The method according to claim 8, where said shuttles at one of said target positions during the initialization operation and/or after a predetermined number of buffer cycles, switch to said initialization operation and are zeroed in the initialization operation with respect to said route zero point and/or are assigned an electronic identity by said open-loop master controller.

10. The method according to claim 7, where information relating to an operating time performed/a distance traveled by individual shuttles and/or wear indicators for individual shuttles is exchanged in said initialization operation between said shuttles and said open-loop master controller.

11. The method according to claim 7, where said open-loop master controller in said initialization operation furthermore issues an operator recommendation to remove shuttles that have been recognized as being worn or defective and/or triggers an automated removal of such shuttles.

12. The method according to claim 7, where said open-loop master controller transmits to said shuttles target positions for starting/exiting said follow operation in dependence of operating states and/or malfunction states and/or container properties.

13. The method according to claim 12, where said open-loop master controller transmissions comprise a continuous adaptation of said target positions to changes in operating states, malfunction states, and/or container properties.

14. The method according to claim 7, where said open-loop master controller transmits to said shuttles target positions for starting/exiting said positioning operation in dependence of operating states and/or malfunction states and/or container properties, and/or target positions for route positions to be moved to in said positioning operation, wherein said open-loop master controller transmissions comprise a continuous adaptation of said target positions to changes in operating states, malfunction states, and/or container properties.

15. A device for buffering containers grouped in a single row in a container treatment system, comprising: an infeed region with at least one infeed conveyor belt, an outfeed region with at least one outfeed conveyor belt, a buffer area extending therebetween transverse in a buffering direction, and a transport system arranged thereabove that comprises shuttles guided on rails and driven independently of one another with row pushers aligned transverse to said buffering direction and present thereon, wherein a control system configured to control said shuttles, said infeed conveyor belt, and said outfeed conveyor belt in dependence of target positions, target speeds and/or target accelerations/decelerations stored specifically for a format and/or material of said containers, and/or configured to control said shuttles in dependence of target positions, target distances, and/or target speeds, stored specifically for modes of operation for initializing said shuttles in a first mode, for said shuttles following preceding shuttles in a second mode, and for moving said shuttles to route positions in a third mode.

16. The device according to claim 15, wherein the control system is further configured to read out said shuttles as a part of the first mode.

17. The device according to claim 15, wherein said row pushers are present on the transport system in pairs for moving said containers in a single row on said buffer area from said infeed region to said outfeed region.

18. The device according to claim 15 said control system comprising: closed-loop slave controllers arranged on said shuttles for said drives of said shuttles; and an open-loop master controller for parameterization of said closed-loop slave controllers specific to the mode of operation of operating states comprising at least one automated initialization operation for moving to a route zero point and/or for assigning an electronic identity/address to said shuttles, a follow operation for moving up said shuttles in an automated manner behind preceding shuttles, and a positioning operation for moving to route positions specified by said open-loop master controller.

19. The device according to claim 15, further comprising an initialization station arranged in a region of said transport system for zeroing a position of said shuttles and/or for assigning an identity issued by said open-loop master controller to said shuttles and/or for reading out an operating time performed/distance travelled by individual shuttles and/or wear indicators for individual shuttles for said open-loop master controller.

20. The device according to claim 15, where said row pushers comprise guide channels, which run transverse to said buffering direction and are defined both in and opposite to said buffering direction, each for receiving said containers in a single row.

* * * * *